Aug. 11, 1942.   F. N. LAUB   2,292,574
PRESSURE REGULATOR
Filed May 31, 1941   3 Sheets-Sheet 1

Inventor
Fred N. Laub.

Attorneys.

Aug. 11, 1942.    F. N. LAUB    2,292,574
PRESSURE REGULATOR
Filed May 31, 1941    3 Sheets-Sheet 2

Inventor
Fred N. Laub.

Attorney

Aug. 11, 1942.  F. N. LAUB  2,292,574
PRESSURE REGULATOR
Filed May 31, 1941  3 Sheets-Sheet 3

Inventor
Fred N. Laub.

Attorneys.

Patented Aug. 11, 1942

2,292,574

UNITED STATES PATENT OFFICE 2,292,574

PRESSURE REGULATOR

Fred N. Laub, Los Angeles, Calif., assignor to Ensign Carburetor Co. Ltd., Huntington Park, Calif., a corporation of California Application May 31, 1941, Serial No. 396,075

3 Claims. (Cl. 50—10)

This invention has reference to pressure regulators, and one of the main purposes of the invention is the provision of a relatively simple pressure regulator mechanism which will handle comparatively large drops in pressure and still not require a device of large size or of structural or functional complications. Where it has been necessary to reduce fluid pressures through a large drop, and to maintain the delivery pressure constant, it has been the usual past practice to use regulator mechanisms with two or more stages of reduction, or regulator mechanisms provided with pilot diaphragms and valves. Where single stage regulators have been used for large reductions of pressure, the results have not been entirely satisfactory because the delivery pressure has necessarily varied to some degree with variations in the high pressure supply. In order to reduce that sympathetic variation to a minimum it has been common in single stage regulators to make the pressure control valve which is exposed to the high fluid pressure as small as practicable in comparison with the diaphragm area exposed to the delivery pressure. However, such an expedient has necessarily resulted in severe limitation on the capacity of a regulator of given size.

It is one of the general objects of the present invention to provide a simple form of mechanism whereby a single stage regulator may be used for regulated reductions of pressure through a large range, and whereby small apparatus with large capacity will maintain a closely regulated output pressure in spite of substantial variations of the input pressure of the supply. It will of course be understood that the invention may be used in connection with the several stages of a multiple stage regulator, and its advantages will apply equally well to each of the several stages.

My invention, as applied to a typical single stage of regulation, may be briefly described as follows. Upon reduction of the delivery pressure at the delivery side of the main regulator diaphragm, the initial movement of the main diaphragm first operates an auxiliary valve which admits fluid pressure from the high pressure inlet to an auxiliary or compensating diaphragm. The resulting movement of the compensating diaphragm applies to the main regulator valve an opening force which is preferably a large fraction of the force necessary to open the large main valve against the high fluid pressure applied to it, and also against the valve closing spring which is usually used. In the design of the actual regulator illustrated in the accompanying drawings, the auxiliary diaphragm mechanism is designed to apply to the main valve a force equal to about 90 per cent of the total resultant force required to open that valve. Then, as the main diaphragm moves further in its valve opening direction, it needs then to apply to the main valve only the remaining 10 percent of the force necessary to open the main valve. The general functional result of this arrangement is that the main diaphragm is then able to regulate the output pressure with the same slight variation from the desired pressure as would be the case if the main regulating valve were only of one-tenth the size, and capacity, of what it actually is in my design.

The auxiliary diaphragm is not, in my design, exposed to the full high pressure of the intake. It is provided with an automatically varying bleed which bleeds off the applied pressure, into the main low pressure outlet chamber of the regulator; and the automatic action of that bleed is such as to reduce the pressure actually applied to the auxiliary diaphragm in an amount which is a function of the opening of both the auxiliary valve and the main valve. This increase in the bleed, and consequent reduction in the auxiliary diaphragm pressure, is made to be such that the effective pressure applied to the auxiliary diaphragm always bears a substantially fixed ratio (90 percent in this case) to the high fluid pressure or total resultant closing pressure on the main valve. As is well known, the fluid pressure tending to close a poppet type valve is higher when the valve is completely closed, and decreases rapidly as the valve is opened. These provisions prevent the opening force exerted by the auxiliary diaphragm from ever being greater than the closing force on the main valve, and they also enable the main diaphragm to accomplish its regulating function very closely. And further, the auxiliary valve also may act as a low capacity pressure regulator, as will be pointed out.

This and other purposes and corresponding accomplishments of the invention will now be best understood from a consideration of the following detailed specification in which a preferred and illustrative form of the invention is described, reference for these purposes being made to the accompanying drawings in which, Fig. 1 is a plan, with parts broken away for purposes of clear illustration;

Figure 1:
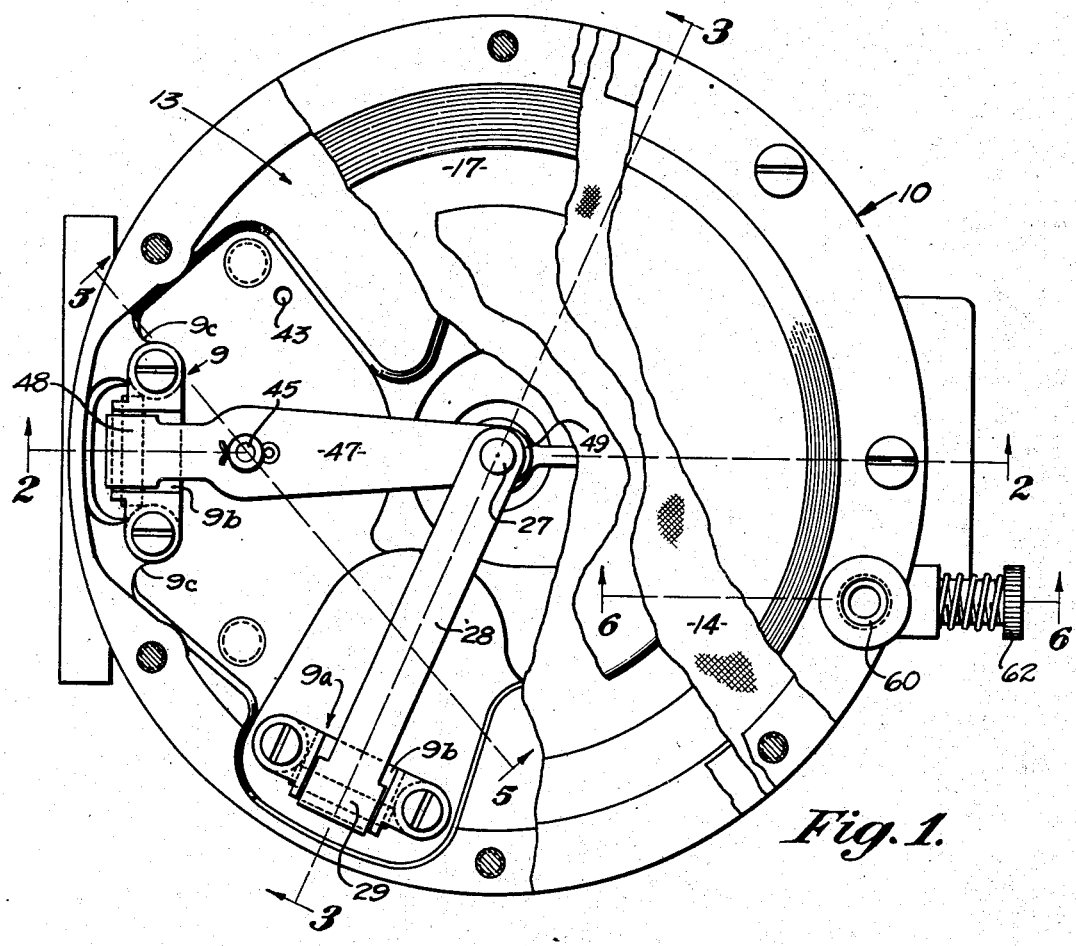

In the drawings numeral 10 indicates a suitable housing, the structural details of which need no description. This housing contains the initial high pressure inlet 11, the low pressure outlet 12, and the main low pressure outlet chamber 13. The main diaphragm 14 is located between a reference pressure chamber 15 and a low pressure diaphragm chamber 16, the latter being partially or restrictedly separated from main low pressure chamber 13 by a wall 17. The particular purposes of this separation of chambers 13 and 16 will be pointed out later; for all of the major functions of the regualtor those two chambers may be considered as if they were one. The reference force or pressure which is applied to main diaphragm 14 may be applied in any manner. The present regulator has been designed to use atmospheric pressure, or modified atmospheric pressure, as the reference pressure; and accordingly the reference pressure chamber 15 is provided.

From inlet 11 a valve port 20 leads directly to low pressure chamber 13, and main valve 21 seats on port 20 by movement in the direction in which the high inlet pressure tends to move it. To insure good seating the valve seating spring 22 is also provided.

Main diaphragm 14 has a diaphragm stem 25 which passes through a guide 26 mounted in wall 17. Restricted communication between chambers 13 and 16 may be provided in any suitable manner, but it is here provided by making stem 25 polygonal in cross section while the bore in guide 26 is cylindric. The reference pressure on diaphragm 14 tends to move it down, while the regulated delivery pressure under the diaphragm tends to move it up. When the diaphragm moves down, the lower end of stem 25 presses down on a button 27 which is mounted in the outer end of a lever 28 pivoted at its other end at 29. Intermediate its ends lever 28 presses down on auxiliary valve stem 30, so that when main diaphragm 14 moves down, the downwardly moving lever 28 moves auxiliary valve 31 downwardly off its seat 32. Valve seat 32 is mounted in a valve fitting 33 which has a vertical bore extending from end to end. This vertical bore is made up of a lower larger bore 34, an intermediate size bore 35, and a small uppermost bore 36. Valve seat 32 is fitted in the larger bore 34 against the shoulder at the upper end of that bore. The lower end of bore 34 is equipped with a press-fitted plug 37 which forms a guide for the lower end of auxiliary valve stem 30 and also forms a supporting seat for the small spring 38 which is merely strong enough to assure movement of the parts to the inactive position of Fig. 3 and the proper seating of valve 31. Plug 37 has an opening 39 through which the inlet high pressure is admitted to bore 34.

When auxiliary valve 31 is moved downwardly off its seat by the initial downward movement of main diaphragm 14, fluid under pressure is immediately admitted to intermediate bore 35. This intermediate bore 35 is connected, via ports 36', chamber 37' and port 38' (see Fig. 5), to the auxiliary diaphragm chamber 40 which is formed in the housing above auxiliary diaphragm 41. Chamber 42, below auxiliary diaphragm 41, is connected by passage 43 with the main low pressure or outlet chamber 13; the finally regulated outlet pressure thus forming the reference pressure for the auxiliary diaphragm.

The pressure from the high pressure inlet, admitted by the auxiliary valve to the upper side of auxiliary diaphragm 41 moves that diaphragm and its diaphragm stem 45 down. The upper end of stem 45 is provided with a ball and socket connection 46 with a lever 47, one end of which is pivoted at 48, the other end 49 bearing down on stem 21a of the main valve 21. A light spring 50 tends to move auxiliary diaphragm 41 downwardly and to keep lever 47 in contact with the main valve stem. It also holds sealing washer 50a in place.

Figure 3:
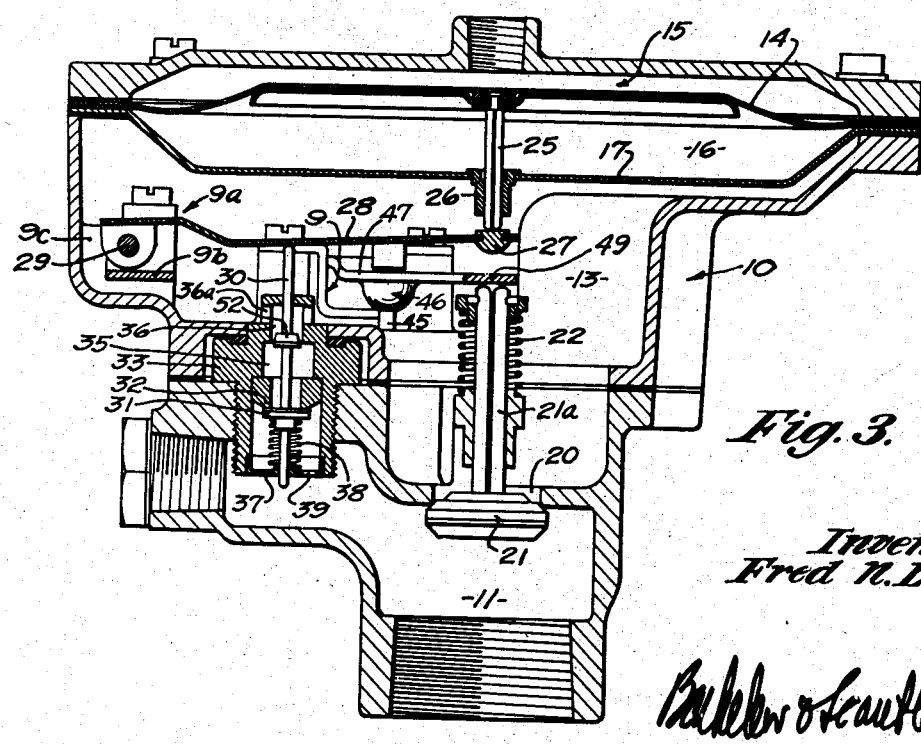
Fig. 3 is a central cross section taken on line 3—3 of Fig. 1.
Figure 5:
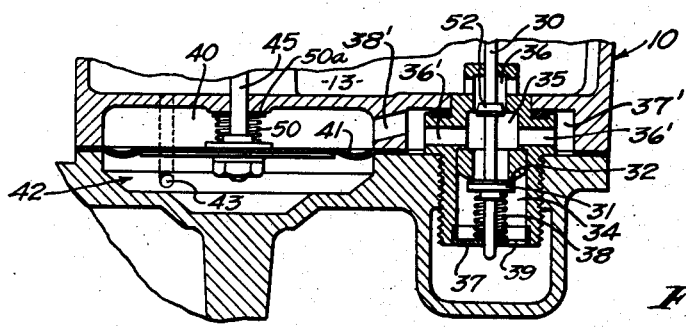
Fig. 5 is a fragmentary section taken on the plane indicated by line 5—5 in Fig. 1.

Auxiliary valve stem 30 carries a bleeder valve plug 52, of about the configuration, and size and position relative to the bore 36, as shown in the drawings. In the closed position of auxiliary valve 31 this valve plug 52 is in its upper position, such as shown in Figs. 3 and 5, where it is substantially wholly within bore 36. The lower part 53 of valve plug 52 may be cylindric, and in its uppermost position that lower cylindric part of the valve plug may lie just below the lower edge of bore 36. The upper part 54 of the valve plug is tapered. The degree of taper, and the exact shape of the tapered portion, as well as its length, may depend on factors of regulator design which are variable. In this particular case, for the regulator herein illustrated, valve plug 52 is of the proportionate size and shape here illustrated, its upper portion 54 being frustroconical. And its length and its position on auxiliary valve stem 30, are such that when auxiliary valve 31 is initially opened and button 27 of lever 28 has moved down onto lever 47, with main valve 21 just ready to open, the upper end of valve plug 54 has just about reached or just passed the lower edge of bore 36. The major diameter of valve plug 52 is just slightly less than the diameter of bore 36, so that there is always a bleed passage through bore 36 into the main low pressure chamber 13. Fluid from bore 36 reaches that low pressure chamber through lateral ports 36a at the upper end of valve fitting 33. The upper end portion 33a of fitting 33 forms a guide for the upper end of valve stem 30.

Figure 4:
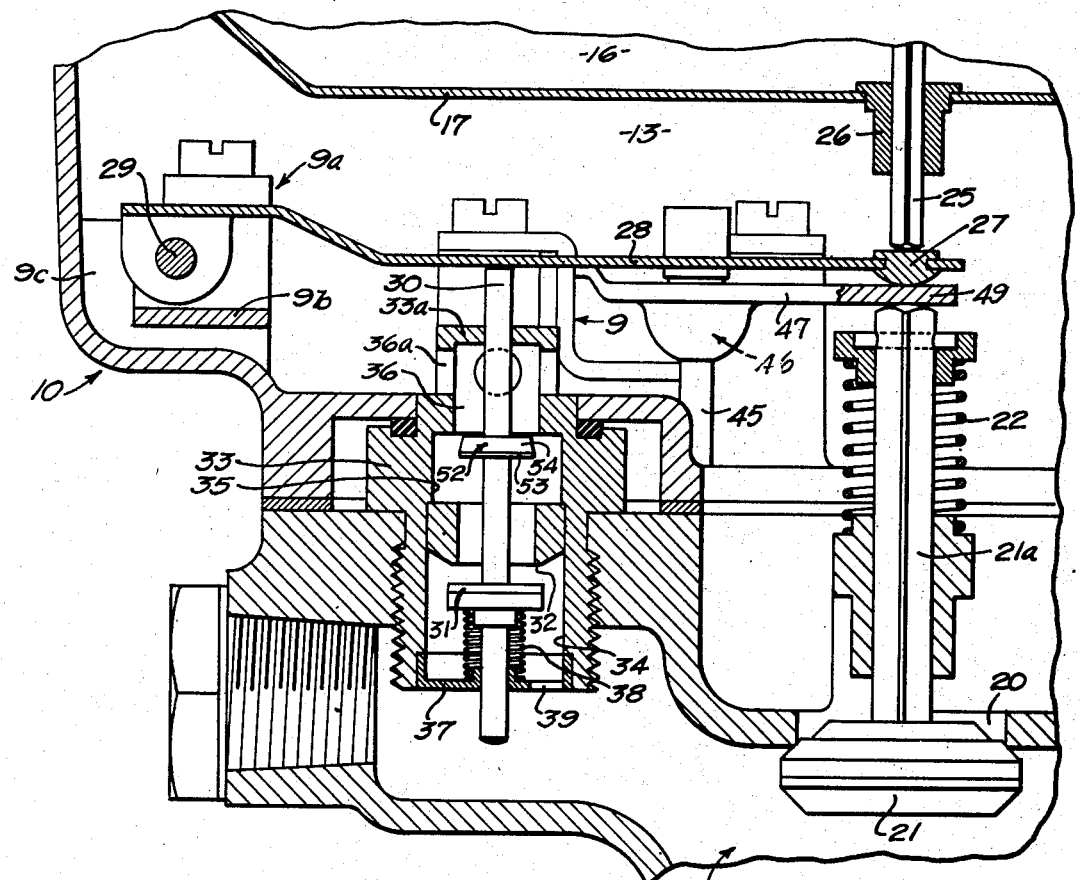
Fig. 4 is an enlargement of certain portions of Fig. 3, and showing the parts in the position in which the auxiliary valve is open.

It will clarify Figs. 3 and 4 if I state that the parts designated generally by the numeral 9 and which appear behind valve stem 30 and levers 28 and 47, are the parts forming the pivotal mounting for lever 47. This mounting is the same as the mounting 9a for pivot 29 of lever 28. Each includes a stirrup 9b whose ends are mounted on lugs 9c of the housing casting.

The particular regulator shown in the drawings has been designed for feeding gaseous fuel, such as butane, from a relatively high pressure source as high as one hundred pounds per square inch, to a carbureter of an internal combustion engine at a pressure preferably slightly subatmospheric. My invention may of course be used in connection with pressure regulators for any purpose, but will be illustratively described as being used for the particular purpose stated.

When the engine is idle and no suction is being applied to regulator outlet 12, the small spring 38 moves auxiliary valve 31, lever 28 and main diaphragm 14 upwardly with sufficient force to insure closure of valve 31. The main valve spring 22 holds the main valve closed. As soon as suction is applied to the regulator outlet, the reference pressure on top of main diaphragm 14 forces that diaphragm down, and that downward movement immediately opens auxiliary valve 31 to admit pressure from high pressure inlet 11 to the upper side of auxiliary diaphragm 41. The pressure thus applied to the auxiliary diaphragm is not equal to the initial high pressure, because that applied pressure is restrictedly bled off past the bleeder valve plug 52 to low pressure chamber 13 and outlet 12. However, the proportioning and design of all the interacting parts are such that, when downward movement of the main diaphragm has moved auxiliary valve 31 and bleeder valve 52 to the positions shown in Fig. 4, with button 27 resting on lever 47, then the effective pressure applied downwardly to auxiliary diaphragm 41 (over and above the low pressure at the under face of that diaphragm) is such that the auxiliary diaphragm then applies to main valve stem 21a a downward opening force equal to, say, 90 percent of the total force necessary to open the main valve. In that position of the parts the initial high inlet pressure is fully effective over the whole area of the main valve to keep it closed; and main valve spring 22 also adds to the closing force. The low pressure in chamber 13 opposes the valve closing forces. In the position of Fig. 4 the valve opening lever 47 exerts a downward force equal to 90 percent of the total resultant force which tends to close the main valve. In this connection it will be remembered that auxiliary diaphragm 41 is also subjected to the low pressure from outlet chamber 13, in opposition to the modified high pressure which is applied to it. Consequently any variation in the low pressure substantially balances itself out, as the low pressure is applied to the auxiliary diaphragm in a direction which tends to allow the main valve to close, and is also applied to the main valve in a direction tending to open it.

Assuming that the draft on regulator outlet 12 is greater than can be supplied by the bleed past valve plug 52, at the delivery pressure for which the regulator is set, the lowered pressure in main diaphragm chamber 16 allows the reference pressure to force that diaphragm further downwardly, to open main valve 21. When the main valve is once open, main diaphragm 14 and main valve 21 then act in the same general manner as an ordinary single stage regulator, except for the fact that variations in the initial high pressure entail only one-tenth as much accompanying variation in the low pressure as they do in an ordinary single stage regulator. In its regulating action the main diaphragm only has to compensate and oppose one-tenth of the effective closing pressures on the main valve, and therefore only has to compensate for one-tenth of the variations in those pressures which tend to close the main valve.

The particular function of valve plug 52 is to vary the effective pressure applied to auxiliary diaphragm 41, so as to compensate for the varying effective pressures which tend to close main valve 21 in its changing operating positions. As is well known, the effective fluid pressure on such a valve as 21 drops off rather sharply as the valve opens. Valve plug 52 is of such configuration and so placed and sized with reference to bore 36 that, in the position of Fig. 4 with the main valve closed, pressure on the auxiliary diaphragm is such as to compensate 90 percent of the resultant effective closing forces on the main valve; and also such that, as the main valve opens, the effective pressure on the auxiliary diaphragm drops off proportionately as the total effective closing force on the main valve drops off. Thus, in all the operating positions of the main regulator valve, the opening forces exerted by the auxiliary diaphragm can never be greater than the resultant closing force on the main valve, and the main diaphragm has only to oppose and compensate for ten percent of the closing forces exerted on the main valve.

The size, shape and position of valve plug 52 as here shown have been determined for the illustrated regulator. For other regulators, and pressures, the valve plug may be slightly different from that allustrated in order to achieve the proper balance of forces in all operating conditions. For instance, in a regulator of large capacity and taking a high inlet pressure, the inlet pressure on the main valve is the predominant closing force on that valve; the spring closing force being relatively small. In a regulator taking a lower initial pressure, the spring closing force—which is substantially a constant— is relatively larger. In such a case the valve plug 52 will be shaped and placed so that the effective pressure applied to the auxiliary diaphragm will drop off toward a relatively higher fixed constant than is the case here.

Another particular which may be varied depends on the following considerations. In the illustrated design auxiliary valve 31 always opens wider as the valve plug 52 opens. The resultant effective pressure on the auxiliary diaphragm is therefore the composite result of the concomitant opening and closing of both valves; and the exact shape, size or placement of valve plug 52 may therefore depend somewhat on the opening and closing characteristics of auxiliary valve 31.

The foregoing description has so far been predicated on the assumption that the minimum draft on the regulator outlet will always be greater than the supply of gas which takes place through the bleeder valve 52. If however the minimum draft should at any time be less than the amount which may be supplied through valves 31 and 52 when in the position shown in Fig. 4, then for that limited capacity the main diaphragm 14 will act in conjunction with valves 31 and 52 as a single stage pressure regulator.

From what has been said it will be readily understood that the function of lever 47 is to transmit a valve opening force from auxiliary diaphragm 41 to main valve 21. Lever 47 does this by having its end rest directly on valve stem 21a. The function of lever 28 is to transmit the pressure induced movements of diaphragm 14 to the auxiliary valve units 31 and 52. In the particular illustrated design it has been found convenient to transmit the movements of diaphragm 14 to main valve 21, and at the same time to move the auxiliary valve units 31 and 52 first independently and then in consonance with the movements of the main valve, by having lever 28 (or its button 27) move down upon the end of lever 47 which rests on the main valve stem. However, it will be understood that other suitable physical connective relations between the parts will accomplish the same results as here described. It is only necessary that auxiliary diaphragm 41 be physically connected with the main valve in such a manner as to apply the described opening forces to the main valve throughout its movement, and that main diaphragm 14 be connected with the auxiliary valve units in such manner that the initial diaphragm movement opens those valves before the main diaphragm is physically connected with the main valve to apply its opening pressure to that valve.

Figure 6:
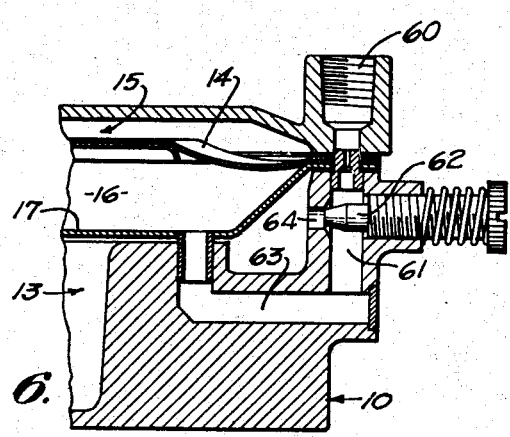
Fig. 6 is a fragmentary section taken on the plane indicated by line 6—6 of Fig. 1.
Figure 2:
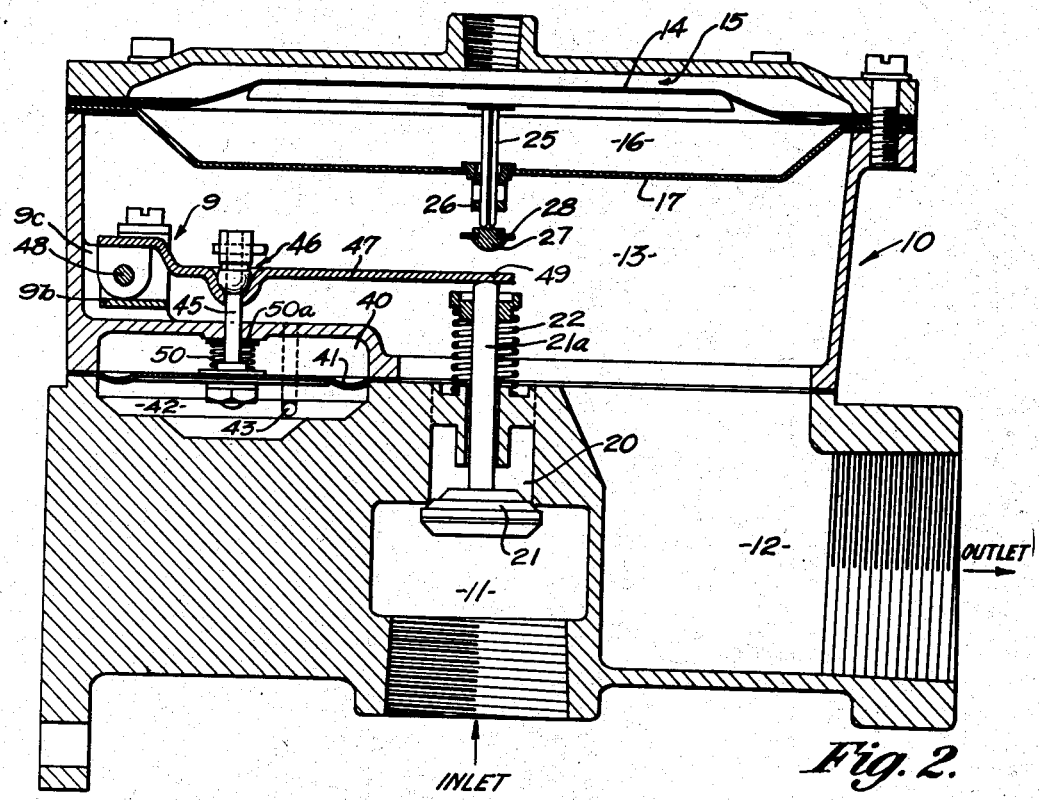
Fig. 2 is a central cross section taken on line 2—2 of Fig. 1.

I have so far considered the action of the regulator as if chambers 13 and 16 were one, or openly interconnected; and they may be so considered insofar as the main purposes of this invention are concerned. The restricted interconnection of the two chambers makes the diaphragm chamber 16 somewhat slow to respond to pressure variations in outlet chamber 13, and that is generally desirable to prevent oscillatory action. The restricted interconnection also allows the pressure in 16 to be slightly modified. For instance, Fig. 6 shows an arrangement for idling control of the regulated outlet pressure. Connection 60 is connected to the suction passage of the carburetor at a point just inside the closed throttle. Manifold depression during idling operation of the engine is thereby applied to passage 61. Control valve 62 adjustably proportions the manifold suction between passage 63 leading to diaphragm chamber 16 and passage 64 leading to outlet chamber 13. The suction thus applied to chamber 16 lowers the pressure in it and thus tends to raise the regulated delivery pressure in 13. And the two passages 63 and 64, in conjunction with the connection to the carbureter, form an idling by-pass.

Wherever I speak herein of diaphragms, I mean to include any of the suitable pressure responsive elements which are understood in this art as equivalents.

I claim:

1. In a pressure regulator having a high pressure inlet and low pressure outlet, a regulating diaphragm exposed on one face to the low outlet pressure, and a regulating valve operable by the diaphragm to open against the high pressure to which the valve is exposed; the features which include, a lost motion connection between the diaphragm and the regulating valve whereby the diaphragm may move independently a limited distance in valve opening direction before applying force to the valve to open it, a pressure actuated mechanism adapted to apply an opening force to the regulating valve, said mechanism including an auxiliary diaphragm exposed on one face to the low outlet pressure of the regulator, and valvular means actuated by the independent movement of the regulating diaphragm and adapted to controllably apply pressure from the high pressure inlet to the other face of the auxiliary diaphragm, said valvular means including an inlet valve which is opened by said diaphragm movement to admit pressure from the inlet to said other face of the auxiliary diaphragm, and a bleeder valve which opens in consonance with the inlet valve to effectively reduce the pressure applied to the auxiliary diaphragm as the regulating diaphragm acts to open the regulating valve.

2. In a pressure regulator having a high pressure inlet and low pressure outlet, a regulating diaphragm exposed on one face to the low outlet pressure, and a regulating valve operable by the diaphragm to open against the high pressure to which the valve is exposed; the features which include, a lost motion connection between the diaphragm and the regulating valve whereby the diaphragm may move independently a limited distance in valve opening direction before applying force to the valve to open it, a pressure actuated mechanism adapted to apply an opening force to the regulating valve, and valvular means actuated by the movement of the regulating diaphragm to controllably apply pressure from the high pressure inlet to the pressure actuated mechanism, said valvular means including an inlet valve which is opened by the independent diaphragm movement to admit pressure from the high pressure inlet to said mechanism, and also including a bleeder valve which is opened in consonance with the opening of the regulating valve by the regulating diaphragm.

3. In a pressure regulator having a high pressure inlet and low pressure outlet, a regulating diaphragm exposed on one face to the low outlet pressure, and a regulating valve operable by the diaphragm to open against the high pressure to which the valve is exposed; the features which include, a lost motion connection between the diaphragm and the regulating valve whereby the diaphragm may move independently a limited distance in valve opening direction before applying force to the valve to open it, a pressure actuated mechanism adapted to apply an opening force to the regulating valve, said mechanism including an auxiliary diaphragm exposed on one face to the low outlet pressure of the regulator, and valvular means actuated by the movement of the regulating diaphragm and acting to controllably apply pressure from the high pressure inlet to the other face of the auxiliary diaphragm, said valvular means including an inlet valve which is opened by the independent movement of the regulating diaphragm to admit high pressure to the auxiliary diaphragm, and also including a bleeder valve which is opened in consonance with the opening of the regulating valve by the regulating diaphragm, all so that the pressure actuated mechanism applies to the regulating valve an opening force which is a substantially constant fraction of the closing forces exerted on that valve in its various operating positions.

FRED N. LAUB.